(12) United States Patent
Kwon et al.

(10) Patent No.: US 6,283,015 B1
(45) Date of Patent: Sep. 4, 2001

(54) STEAM EXHAUST SYSTEM OF AN ELECTRIC PRESSURIZING RICE COOKER

(75) Inventors: Kyung-Ahn Kwon, Koyang; Yong-Ho Lee, Changwon, both of (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/789,493

(22) Filed: Feb. 22, 2001

(30) Foreign Application Priority Data

Apr. 11, 2000 (KR) .................................................. 00-19018

(51) Int. Cl.7 ................................ A23L 1/00; A47J 27/00; F27D 11/02
(52) U.S. Cl. ................................ 99/337; 99/333; 99/338; 99/342; 99/403; 219/435; 219/441; 219/492; 219/494
(58) Field of Search ............................. 99/326–335, 337, 99/338, 339, 340–342, 403–407, 446, 450, 470, 472; 126/369, 376.1, 377.1; 219/385, 386, 429–433, 441, 442, 492–494, 497, 509, 510; 220/316, 325, 912; 426/508, 523

(56) References Cited

U.S. PATENT DOCUMENTS

| | | | |
|---|---|---|---|
| 4,241,288 | * 12/1980 | Aoshima et al. | .................... 219/441 |
| 4,315,138 | * 2/1982 | Miwa | ................................ 99/333 X |
| 4,362,923 | * 12/1982 | Aoshima | .......................... 219/492 X |
| 4,421,974 | * 12/1983 | Oota et al. | ....................... 219/494 X |
| 4,431,906 | * 2/1984 | Oota et al. | ......................... 99/333 X |
| 4,438,324 | * 3/1984 | Narita et al. | .................... 219/433 X |
| 4,441,016 | * 4/1984 | Oota et al. | ........................... 219/441 |
| 4,455,480 | * 6/1984 | Matsumoto et al. | ............... 99/325 X |
| 4,463,249 | * 7/1984 | Narita et al. | .................... 219/432 X |
| 4,617,452 | * 10/1986 | Miwa | ................................... 219/441 |
| 4,625,097 | * 11/1986 | Miwa | ............................. 219/438 X |
| 4,674,890 | * 6/1987 | Kojima et al. | .................... 99/327 X |
| 5,048,400 | * 9/1991 | Ueda et al. | ........................ 99/331 X |

\* cited by examiner

Primary Examiner—Timothy F. Simone
(74) Attorney, Agent, or Firm—Birch, Stewart, Kolasch & Birch, LLP

(57) ABSTRACT

A steam exhaust system of an electric pressurizing device which can control the pressure in a cooking vessel and simultaneously can prevent the pressure in the cooking vessel from excessively increasing during the cooking operation. In the steam exhaust system, a steam exhaust pipe penetrates a lid of the electric pressurizing device, and has a steam exhaust channel formed therein. A valve assembly is provided which includes a frame and a pressurizing plate. The valve assembly opens and closes the steam exhaust channel of the steam exhaust pipe by the pivoting of the pressurizing plate. A pressure control device actuates the valve assembly by way of a magnetic force to control the blocking pressure in the steam exhaust pipe.

7 Claims, 3 Drawing Sheets

(a)

(b)

US 6,283,015 B1

STEAM EXHAUST SYSTEM OF AN ELECTRIC PRESSURIZING RICE COOKER

BACKGROUND OF THE INVENTION

1. Field of the Invention

The present invention relates to an electric pressurizing rice cooker, and more particularly to a steam exhaust system of an electric pressurizing rice cooker, which can control the pressure in a cooking vessel and simultaneously can prevent the pressure in the cooking vessel from excessively elevating during the cooking process.

2. Description of the Related Art

An electric rice cooker is an appliance for cooking rice which utilizes electricity as a heating source. Especially in an electric pressurizing rice cooker, the interior of a cooking vessel is maintained at a relatively high pressure, higher than that of the atmosphere, so that the cooking in the cooking vessel can be rapidly performed.

As shown in FIG. 1, a conventional electric pressurizing rice cooker includes a cooking vessel 10, a cooker housing 12 in which the cooking vessel 10 is accommodated, a lid 14 for opening and closing the cooker housing 12, an electric system for heating/warming the cooking vessel 10, and a steam exhaust system for controlling the pressure in the cooking vessel 10 during the course of cooking.

Referring to FIG. 2, the electric system includes a working coil 16 and a heater 18 disposed in the cooker housing 12. The working coil 16 generates induced currents for cooking, and the heater 18 functions to generate relatively less heat for warming rice in a so-called warming mode.

Meanwhile, the steam exhaust system includes a solenoid valve 20 and a poise valve 30. The solenoid valve 20 is automatically opened to lower the pressure in the cooking vessel 10 when a predetermined amount of time has passed after the cooking is initiated. The poise valve 30 is opened when the pressure in the cooking vessel 10 exceeds a predetermined value during the course of cooking to prevent the pressure in the cooking vessel from excessively elevating, and simultaneously to maintain the pressure constant.

As shown in FIG. 3, the solenoid valve 20 is disposed at a top plate 141 of the lid 14, and includes a first steam exhaust pipe 22 interconnected to the exterior of a top cover 142, a diaphragm 24 for opening and closing a steam hole 22a in the first steam exhaust pipe 22, a plunger 26 assembled with the diaphragm 24, and a solenoid coil 28 for actuating the plunger 26.

The poise valve 30 as described above includes a second steam exhaust pipe 32 penetrating through the lid 14, and a pressurizing weight 34 disposed at the upper end of the second steam exhaust pipe 32 outside of the lid 14.

The pressurizing weight 34 supports a valve pin 35 received through the top of the pressurizing weight 34, in such a manner that the valve pin 35 can open and close the upper end of a steam exhaust channel 32a of the second steam exhaust pipe 32. The pressurizing weight 34 has an exhaust port 34a formed through the bottom of the pressurizing weight 34, through which steam can be exhausted.

Hereinafter, will be described the cooking operation by the electric pressurizing rice cooker having the construction as described above.

At first, the working coil 16 induces eddy current at the cooking vessel 10, which slowly heats the cooking vessel 10, so as to promote a so-called soaking process during which water is absorbed in each grain of rice. After the soaking process is performed for a predetermined period, the cooking vessel is heated at a high temperature, so that the temperature of the water in which the rice is immersed is rapidly elevated to the boiling point.

In this case, the upper end of the cooking vessel 10 is firmly coupled to the lower surface of the top plate 141 by an assembling device (not shown), and the solenoid valve 20 and the poise valve 30, which are parts of the steam exhaust device, are maintained in a closed position. Accordingly, when the boiling process is initiated and the water begins to boil, steam is generated to make the pressure in the cooking vessel 10 higher than that in the atmosphere.

Due to the increase of the pressure in the cooking vessel 10, the temperature in the cooking vessel 10 elevates beyond the boiling point of 100° C. at the normal atmospheric pressure, so that the rice is cooked faster than at normal atmospheric pressure.

When the boiling process during a predetermined period is completed, a steaming process is initiated in the state where the heating is stopped. In the steaming process, the rice is steamed, without being separately heated, by the steam remaining in the cooking vessel after the boiling process, usually after the water is completely boiled away.

After the steaming process is completed for a predetermined amount of time, the steam in the cooking vessel 10 is exhausted by the operation of the solenoid valve 20, so that the pressure in the cooking vessel 10 is lowered. In this state, a warming process is initiated in which the cooking vessel 10 is heated by a relatively low degree of heat, at a relatively low, constant temperature by means by the heater 18.

In this case, when the solenoid valve 20 is operated, electric power is first applied to the solenoid coil 28 by a control section (not shown). Then, magnetic force generated by the solenoid coil 28 actuates the plunger 26, which elastically deforms the diaphragm 24 to open the steam hole 22a. Then, the steam in the cooking vessel 10 is exhausted through the opened steam hole 22a and steam channel of the first steam exhaust pipe 22 interconnected to the steam hole 22a.

Further, when the pressure in the cooking vessel 10 becomes higher than a predetermined reference value during the course of the cooking operation, the poise valve 30 is operated to exhaust a desired amount of steam in the cooking vessel 10, thereby preventing an excessive elevation of pressure.

Hereinafter will be described, in detail, the operation of the poise valve 30 as described above.

First, before the pressure in the cooking vessel 10 reaches a predetermined reference value, the steam exhaust channel 32a of the second steam exhaust pipe 32 is maintained closed by the valve pin 35. This is because the valve pin 35 is forced downward due to the weight of the pressurizing weight 34 so as to block off the steam exhaust channel 32a. When the pressure in the cooking vessel 10 exceeds the reference value, that is, the weight of the pressurizing weight 34, the valve pin 35 is pushed upward causing the pressurizing weight 34 to vibrate and become cooked. The steam exhaust channel 32a is then opened, whereby the steam in the cooking vessel 10 is exhausted through the exhaust port 34a of the pressurizing weight 34. The pressure in the cooking vessel 10 is then lowered below the reference value.

When the pressure in the cooking vessel 10 is lowered below the reference value, the pressurizing weight 34 recovers its balance due to its construction, so that the valve pin 35 again blocks off the steam exhaust channel 32a, thereby preventing an excessive pressure reduction. The repetition of the above process maintains the pressure in the cooking vessel 10 in a predetermined range during the cooking process.

In the conventional electric pressurizing rice cooker as described above, effective cooking is achieved through the safe operation of and the pressure control of the steam exhaust system.

However, according to the conventional technique as described above, since the poise valve 30 maintains the pressure in the cooking vessel 10 at a predetermined level by means of the operation of the pressurizing weight 34 during the cooking operation, only pressurized cooking at a single predetermined pressure can be performed. Accordingly, there is a restriction in the conventional electric pressurizing rice cooker, in that it is impossible to cook food into various states according to the user's tastes by controlling the pressure in the cooking vessel 10.

Further, the conventional electric pressurizing rice cooker is also problematic, in that its manufacturing cost is relatively high, since the solenoid valve 20 having a complicated construction and requiring a relatively large number of parts is necessary in addition to the poise valve 30 in the conventional cooker.

SUMMARY OF THE INVENTION

Accordingly, the present invention has been made in an effort to solve the problems occurring in the related art, and thus it is an object of the present invention to provide a steam exhaust system for an electric pressurizing rice cooker, which can control the pressure in the cooking vessel and simultaneously can prevent the pressure in the cooking vessel from excessively elevating during the cooking operation.

In order to achieve the above object, the present invention provides a steam exhaust system of an electric pressurizing rice cooker, the steam exhaust system comprising a steam exhaust pipe which penetrates the lid of the electric pressurizing rice cooker, the steam exhaust pipe having a steam exhaust channel formed therein; a valve assembly including a frame and a pressurizing plate, the frame being assembled with the steam exhaust pipe, the pressurizing plate having a first end pivotally assembled with an upper end of the frame and a second end detachably fitted into an upper end of the steam exhaust pipe, the valve assembly opening and closing the steam exhaust channel of the steam exhaust pipe by the pivoting of the pressurizing plate. A pressure control means is provided for actuating the valve assembly by means of magnetic force, to control the blocking pressure in the steam exhaust pipe.

Preferably, the pressure control means includes an electromagnet for applying an attraction to the pressurizing plate, and a control section for controlling an electric power applied to the magnetic coil of the electromagnet. The electromagnet includes a bobbin and a magnetic coil. The bobbin is mounted to the frame and disposed under the pressurizing plate of the valve assembly. The magnetic coil surrounds the bobbin.

In accordance with another aspect of the present invention, instead of the above valve assembly, the steam exhaust system may have another valve assembly, which comprises: a valve cap having the shape of a tripod, the valve cap being disposed above the steam exhaust pipe, the valve cap being capable of moving up and down to thereby open and close the steam exhaust channel of the steam exhaust pipe; and a stand for supporting the valve cap, the valve cap being attached to the stand by means of a magnetic force.

BRIEF DESCRIPTION OF THE DRAWINGS

The above objects and other features and advantages of the present invention will become more apparent after the following detailed description when taken in conjunction with the drawings, wherein.

DETAILED DESCRIPTION OF PREFERRED EMBODIMENTS

Figure 1:
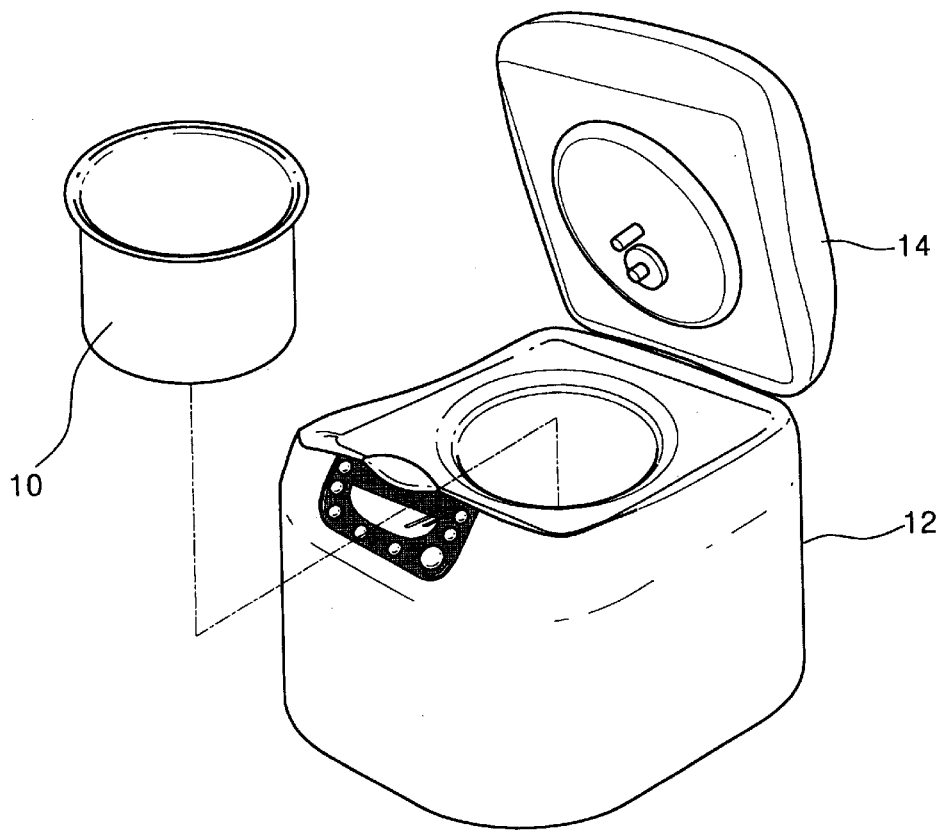
FIG. 1 is a perspective view of a conventional electric pressurizing rice cooker.
Figure 2:
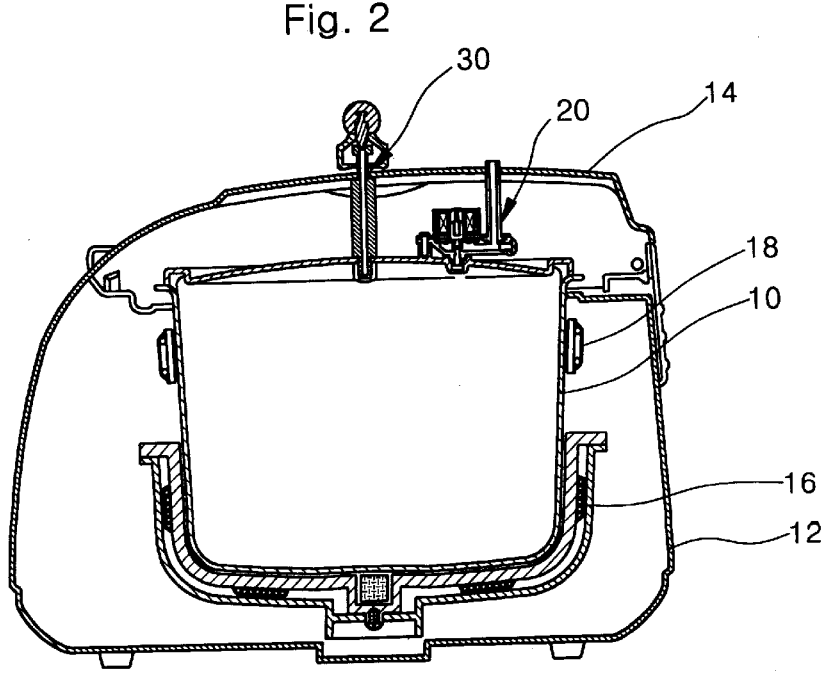
FIG. 2 is a sectional view of the conventional electric pressurizing rice cooker shown in FIG. 1.
Figure 3:
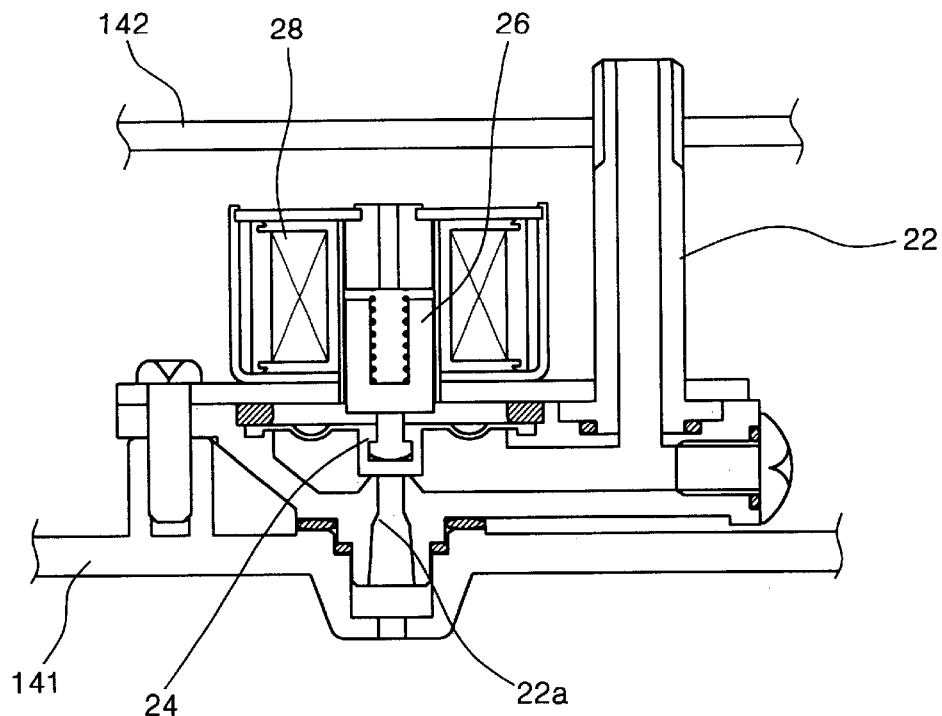
FIG. 3 is a sectional view of a solenoid valve employed in a conventional steam exhaust system of the conventional electric pressurizing rice cooker.
Figure 4:
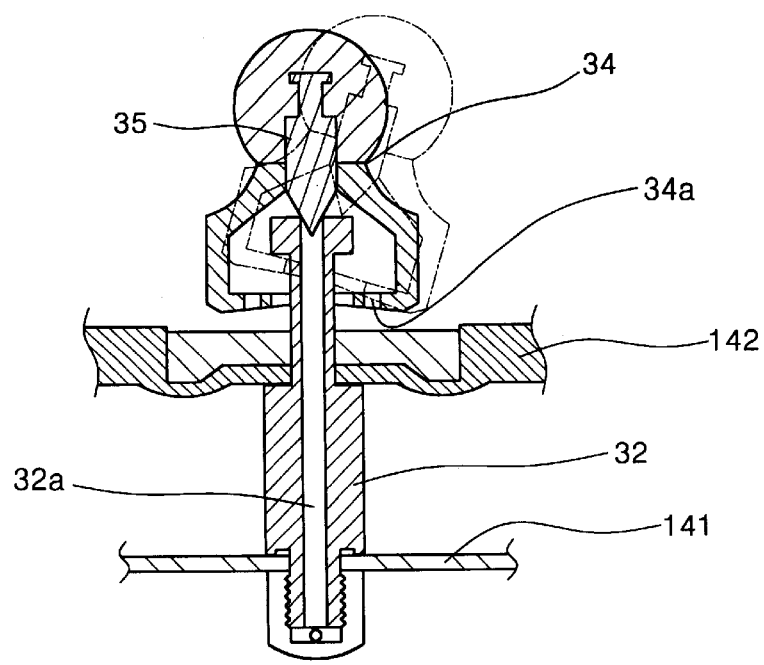
FIG. 4 is a sectional view of a poise valve employed in a conventional steam exhaust system of the conventional electric pressurizing rice cooker.

The above and other objects, characteristics, and advantages of the present invention will become apparent from the following description taken with the accompanying drawings, in which the same elements will be designated by the same reference numerals throughout the various figures.

Figure 5:
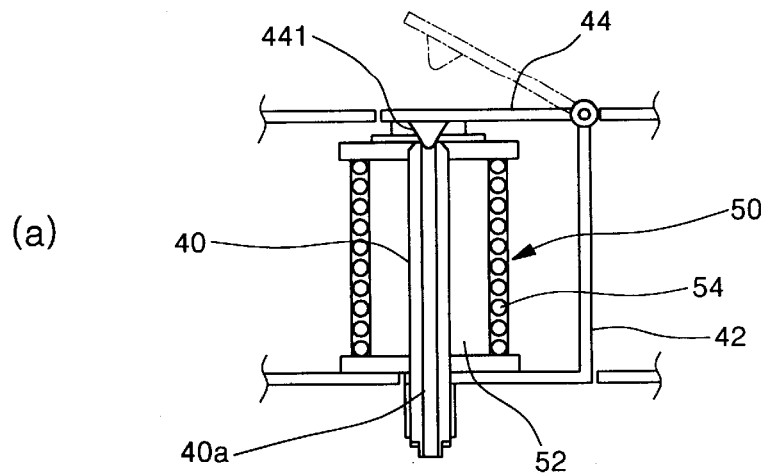
FIGS. 5a and 5b are sectional views of steam exhaust systems of an electric pressurizing rice cooker according to the present invention, showing the constructions and the operations thereof.
Figure 5:
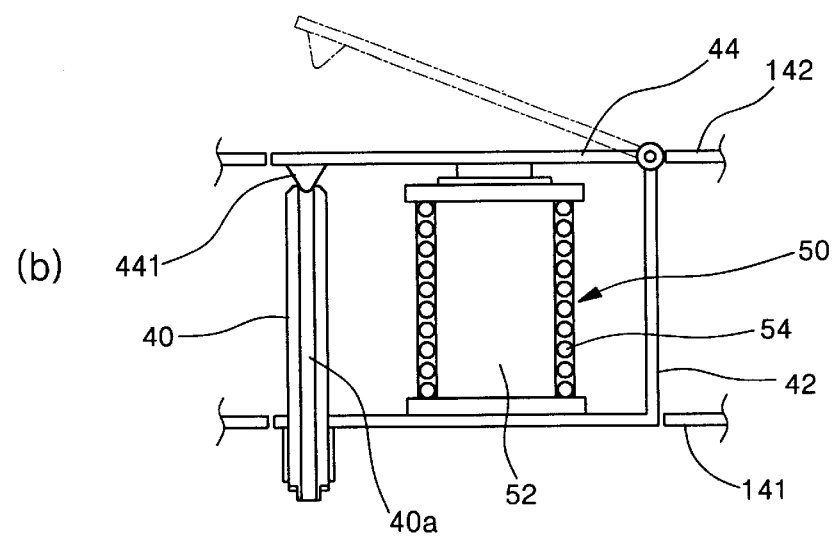

Referring to FIGS. 5a and 5b, the steam exhaust systems of an electric pressurizing rice cooker according to the various embodiments of the present invention include a steam exhaust pipe 40, a valve assembly, and pressure control means. The steam exhaust pipe 40 is disposed penetrating the top plate 141 of the lid 14 and has a steam exhaust channel 40a formed in the steam exhaust pipe 40. The valve assembly opens and closes the steam exhaust channel 40a of the steam exhaust pipe 40. The pressure control means actuates the valve assembly by means of magnetic force, so as to control the blocking pressure in the steam exhaust pipe 40.

The valve assembly includes a frame 42 and a pressurizing plate 44. The frame 42 is assembled with the steam exhaust pipe 40. One end of the pressurizing plate 44 is hingedly and pivotally assembled with the upper end of the frame 42, and the other end of the pressurizing plate 44 is detachably fitted into an upper end of the steam exhaust pipe 40. In this case, the pressurizing plate 44 has a sufficiently light weight which can not have a large influence on the pressure formation in the cooking vessel.

Moreover, a nozzle cap 441 having a conical shape is provided at a lower surface of the pressurizing plate 44 so that the opening and closing of the steam exhaust channel 40a can be performed more effectively.

In the meantime, the pressure control means includes an electromagnet 50 and a control section. The electromagnet 50 includes a bobbin 52 mounted to the frame 42 and disposed under the pressurizing plate 44 of the valve assembly, and a magnetic coil 54 surrounding the bobbin 52. The electromagnet 50 applies an attraction to the pressurizing plate 44, and the control section controls the electric power applied to the magnetic coil 54 of the electromagnet 50.

The steam exhaust system having the construction as described above is classified into an integrated type and a separated type, according to the position of the electromagnet 50. In the integrated type as shown in FIG. 5a, the steam exhaust pipe 40 is inserted in the electromagnet 50. In the separated type as shown in FIG. 5b, the electromagnet 50 is distanced away from the steam exhaust pipe 40.

By the steam exhaust systems according to the embodiments of the present invention as described above, the cooking can be performed selectively in a non-pressurizing mode and in a changeable-pressure mode, and an excessive pressure prevention function for preventing the pressure in the cooking vessel from excessively elevating can be performed. All of these advantageous functions and characteristics by the steam exhaust systems will be described in turn hereinafter.

First, in the non-pressurizing mode, even in the case where the pressure in the cooking vessel is elevated slightly over the atmospheric pressure, the pressurizing plate 44 is lifted up due to the light weight of the pressurizing plate 44, so that the steam can be exhausted. Therefore, the pressure in the cooking vessel is always maintained at substantially atmospheric pressure.

Accordingly, the temperature of the water in the cooking vessel cannot be elevated above the boiling point of 100° C. under atmospheric pressure, no matter how much heat is applied thereto, and no matter how long the heat is applied thereto. This means that the rice can be cooked under atmospheric pressure by a cooker having the steam exhaust system of the present invention.

Further, in the changeable-pressure mode, the pressurizing plate 44 and the electromagnet 50 are assembled together by the magnetic force of the electromagnet 50 with a force stronger than atmospheric pressure.

Therefore, in the case where the blocking pressure formed by the pressurizing plate 44 assembled with the magnetic force of the electromagnet 50 is higher than the atmospheric pressure, the water contained in the cooking vessel has a boiling temperature which is higher than that experienced under atmospheric pressure, because of the pressure increase in the cooking vessel due to the steam being generated in the boiling process.

In the changeable-pressure mode as described above, by controlling the electric power applied to the electromagnet 50 by the control section, the assembling force between the electromagnet 50 and the pressurizing plate 44 is controlled, and accordingly the blocking pressure in the steam exhaust pipe 40 is controlled. According to this mode, in the case where the pressure in the cooking vessel exceeds the blocking pressure applied to the pressurizing plate 44, the pressurizing plate 44 is pivoted about a hinge shaft and is lifted up as shown by the phantom lines in the drawings, so that the steam exhaust channel 40a can be opened. Thus, a predetermined amount of the steam in the cooking vessel is exhausted through the steam exhaust channel 40a, so that the pressure is prevented from elevating above a predetermined value. Accordingly, the excessive pressure prevention function as described above is effectively performed.

After the pressure in the cooking vessel is decreased by the excessive pressure prevention function, the pressurizing plate 44 is assembled again with the electromagnet 50 to block off the steam exhaust channel 40a, so that the pressure is again increased.

In the changeable-pressure mode, which is especially proper for heating food to a relatively high temperature, it is possible to cook at various temperatures according to the user's taste by controlling the electric power applied to the electromagnet 50 by means of the control section.

Figure 6:
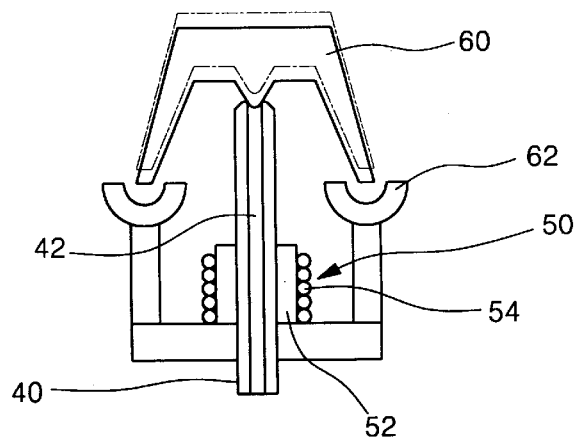
FIG. 6 is a sectional view of a steam exhaust system of an electric pressurizing rice cooker according to another embodiment of the present invention, showing its construction and operation.

FIG. 6 show a steam exhaust system according to another embodiment of the present invention, wherein a valve assembly of the system includes a valve cap 60 having the shape of a tripod and a stand 62 having a semicircular section. The valve cap 60 is disposed above the steam exhaust pipe 40 in such a manner that the valve cap 60 can move up and down. The valve cap 60 is attached to and supported by the stand 62 a magnetic force.

According to this embodiment of the present invention, the valve cap 60 maintains its balance in the state of being loaded on the steam exhaust pipe 40 by its own weight, during the cooking in the non-pressurizing mode. On the other hand, during the cooking in the changeable-pressure mode, the valve cap 60 is attracted downward by the magnetic force generated by the electromagnet 50, so as to block off the steam exhaust channel 40a, thereby controlling the pressure in the cooking vessel.

When the excessive pressure prevention function is performed, the entire valve cap 60 is held at a predetermined distance above the stand 62 as shown by the phantom line in FIG. 6, so as to open the steam exhaust channel 40a.

As described above, by utilizing the steam exhaust systems according to the embodiments of the present invention as described above, cooking can be performed selectively in a non-pressurizing mode and in a changeable-pressure mode, according to the user's taste. Further, even in the case of cooking in a so-called pressurizing mode, in which the interior of the cooking vessel is maintained pressurized while the cooking is performed, there is another advantage in that the state of the cooked rice can be selected in a variety of ranges by controlling the magnitude of the pressure in the cooking vessel.

The steam exhaust system according to the present invention can be employed, not only in a pressurized rice cooker, but also in other various cookers, such as all-purpose cookers, which use pressure control during cooking.

The steam exhaust system according to the present invention can perform the cooking selectively in the non-pressurizing mode and in the changeable-pressure mode, and can control the pressure in the cooking vessel 10 in the so-called pressurizing mode, as described above. Therefore, the cooking can be performed in various manners, according to the user's taste. This improves the marketability of the cooker.

Furthermore, the present invention makes the construction of the rice cooker simpler, since a separate safety member such as the poise valve 30 is not necessary in the steam exhaust system of the present invention. As a result, the marketability of the cooker is further improved.

While there have been illustrated and described what are considered to be the preferred specific embodiments of the present invention, it will be understood by those skilled in the art that the present invention is not limited to the specific embodiments thereof, and thus various changes and modifications and equivalents may be substituted for elements thereof without departing from the true spirit and scope of the present invention.

What is claimed is:

1. A steam exhaust system of a pressurized cooking device which comprises:

a steam exhaust pipe extending from the cooking device;

a valve assembly including a frame member and a pressurizing plate, said frame member being assembled with the steam exhaust pipe, said pressurizing plate having a first end pivotally assembled with an upper end of the frame member and a second end detachably fitted to close on an upper end of the steam exhaust pipe, the valve assembly opening and closing the steam exhaust pipe by a pivoting of the pressurizing plate; and a pressure control means for actuating the valve assembly utilizing a magnetic force to control the blocking pressure in the steam exhaust pipe.

2. The steam exhaust system as claimed in claim 1, wherein the pressure control means includes an electromagnetic means for applying an attraction to the pressurizing plate, the electromagnetic means including a bobbin and a magnetic coil, the bobbin being mounted to the frame and disposed under the pressurizing plate of the valve assembly and surrounded by the magnetic coil; and a control section for controlling electric power applied to the magnetic coil of the electromagnetic means.

3. The steam exhaust system as claimed in claim 1, wherein the valve assembly comprises:

a valve cap having a shape of a tripod, the valve cap being disposed above the steam exhaust pipe, the valve cap being capable of moving up and down to open and close the steam exhaust pipe; and a stand for supporting the valve cap, the valve cap being attached to the stand by means of said magnetic force.

4. A steam exhaust system for use in a cooker having a cooking vessel, the system including a steam exhaust channel adapted to exhaust steam from the cooking vessel, and an electromagnet adapted to open and close the steam exhaust channel for adjusting the steam pressure in the cooking vessel, wherein the opening and closing of the steam exhaust channel by the electromagnet is controlled by controlling the current applied to the electromagnet in a continued fashion during a cooking process, so that a steam flow resistance in the steam exhaust channel is controlled.

5. A steam exhaust system for a pressurized cooking device which comprises:

a steam exhaust channel extending from the cooking device;

a valve assembly connected to the cooking device, said valve assembly containing a pressurized plate for opening and closing the steam exhaust pipe in response to the pressure within the cooking device; and a pressure control system for selectively regulating the pressure within the cooking device, said pressure control system including an electromagnet for generating a magnetic force, said electromagnetic means being operatively associated with the pressurizing plate.

6. The steam exhaust system of claim 5, wherein the electromagnetic means is disposed adjacent to the steam exhaust channel.

7. The steam exhaust system of claim 5, wherein the electromagnetic means surrounds at least a portion of the steam exhaust channel.

* * * * *